Nov. 27, 1923.
E. PIRON
1,475,243
DISTILLING OR REFINING COLUMN
Filed July 22, 1922
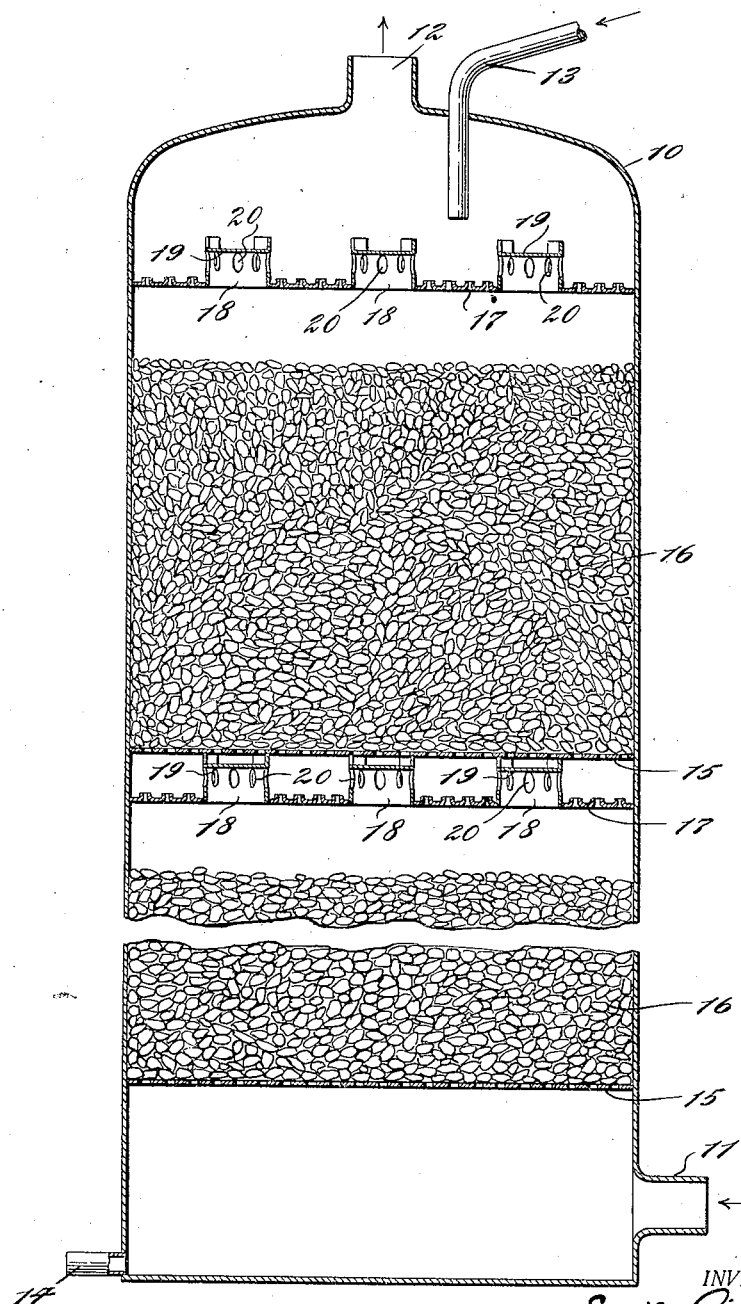
INVENTOR.
Emil Piron
BY
Siffres & Bull
ATTORNEYS Patented Nov. 27, 1923.

1,475,243

UNITED STATES PATENT OFFICE.

EMIL PIRON, OF NEW YORK, N. Y., ASSIGNOR TO PIRON COAL DISTILLATION SYSTEMS, INC., OF NEW YORK, N. Y., A CORPORATION OF DELAWARE.

DISTILLING OR REFINING COLUMN.

Application filed July 22, 1922. Serial No. 576,666.

*To all whom it may concern:*

Be it known that I, EMIL PIRON, a citizen of the King of the Belgians, residing at New York city, in the county and State of New York, have invented certain new and useful Improvements in Distilling or Refining Columns, of which the following is a specification.

My present invention relates to columns in which upwardly ascending vapors are brought into contact with extended surfaces washed by a liquid passing down through the column, such columns being used as distilling or refining columns or in some cases, as scrubbers.

As such apparatus has heretofore been used, it has been the practice to pour over the surface of a quantity of small-size material, such as small beads or cylinders of uniform size, broken stone or the like, liquid which then trickles down through the interstices of this small-size material, while at the same time, through the foraminous supporting plate for this small-size material, the vapors pass upward. I have found such columns are inefficient, because the vapor and the liquid are not brought in intimate contact throughout the height of the column, due to the fact that the liquid usually finds a path or paths which are easier to follow than others through the small-size material, so that the liquid is not uniformly distributed in its descent through this small-size material. Similarly, the vapors find their way up through the small-size material over paths not followed by the down-coming liquid.

It is one of the objects of my invention to improve such columns so that the vapor and the liquid will be brought into more intimate contact as the two are passing through the small-size material.

My invention will be best understood from the following description and the annexed drawing of a form of apparatus which I have adopted for purpose of illustration.

In the drawing, 10 is a column having a vapor inlet 11 at the bottom and a vapor outlet 12 at the top. Also at the top is a liquid inlet 13 and a liquid outlet 14 is located at the bottom of the column.

In the column are a series of foraminous trays 15 spaced apart and each covered by a layer of small-size material 16 of the type used in such columns.

Above the top surface of each layer 16 and beneath the bottom of the foraminous tray above it, I provide a means by which the liquid which has passed through the layer of small-size material above and also through the tray on which such layer rests, will be prevented from falling directly on the layer of small-size material below, and instead will be caught and redistributed so that when it reaches the top surface of the layer of small-size material beneath, it will be redistributed so as to be substantially uniformly applied to such top surface. Specifically, the means which I have shown to this end is a perforated diaphragm 17 having a large number of small holes through which the liquid may rain down onto the top surface of the layer of small-size material below, such perforations preferably being provided with slightly raised edges to better distribute the liquid falling on the top surface of the diaphragm. In order that the upwardly passing vapors may pass the diaphragm 17 without interfering with the down-coming liquid passing through the perforations of such diaphragms, I preferably provide one or more vapor ports or openings 18 through each of the diaphragms 17 and cover this port with a cap, such as 19, to prevent the liquid from the tray 15 above the opening 18 from falling directly through such opening without being redistributed by the diaphragm 17. The opening 18 may be provided with upstanding walls, as shown, and the cap may cover such walls which are then provided with openings, as 20, through which the vapor may pass. The cap may be supported either on the walls surrounding the opening 18 or from the tray 15 above, as desired.

In use, the total amount of small-size material over which it is desired to pass the liquid and the vapor will be divided into a number of parts, each part being supported on one of the trays 15. Then the vapor passes in through the opening 11 and the liquid through the pipe 13. The liquid is caught on the first diaphragm 17 and distributed in a substantially uniform rain over the surface of the uppermost layer 16 of the small-size material. It now trickles down through the interstices of this small-size material, but, because of the relative thinness of the layer, this liquid has small chance of becoming concentrated in one or more paths before reaching the tray 15 on which that layer is supported. The liquid now falls through the openings in the tray 15 but is received on a second diaphragm 17 by which it is again redistributed so as to fall on the next layer 16 in the same manner as on the first. This is repeated throughout the height of the column and it will be obvious that by catching and redistributing the liquid after it has passed through a relatively thin layer of the small-size material, the same effect is obtained as if it were possible to have the same quantity of small-size material supported on a single tray with the liquid passing uniformly downward through it.

Because of the high efficiency of my novel apparatus, the total quantity of small-size material used will not be as great as would be required for a column to produce even approximately the same results in which all of the small-size material is supported on a single tray or even where it is supported on a number of successive trays. Consequently, by my invention, highly efficient results may be obtained with a very much smaller apparatus or the same efficiencies may be obtained with a large-size apparatus as has heretofore been possible with only a column of the smallest diameter, say, of approximately one inch or less as used in laboratories.

The thickness of the layer 16 will depend, of course, on the character of small-size material to be used, and also on the desired efficiencies. If this small-size material is of beads or small cylinders of uniform size, the tendency to establish definite paths is less than if the material is crushed stone or the like, so that thicker masses of such beads or cylinders could be used than of the crushed material.

While I have shown the diaphragm 17 as a convenient method of redistributing the liquid between its successive passages through the layers 16, it will be obvious that many other forms of such liquid-distributing devices may be used. It will also be understood that the embodiment of my invention may be widely varied.

I claim:

1. In an apparatus of the class described, a column having a liquid inlet and a vapor exit at the top and a vapor inlet and a liquid outlet at the bottom thereof, a plurality of horizontal foraminous trays spaced apart in said column, a layer of loose material on each of said trays, and means between the top of each layer and the bottom of the tray above it to catch the liquid passing through the tray and to redistribute it as it falls to the layer of loose material beneath.

2. In an apparatus of the class described, a column having a liquid inlet and a vapor exit at the top and a vapor inlet and a liquid outlet at the bottom thereof, a plurality of horizontal foraminous trays spaced apart in said column, a layer of loose material on each of said trays and a foraminous diaphragm between the top of each layer and the bottom of the tray above it having its openings arranged to distribute the liquid substantially uniformly over the top surface of the layer beneath it.

3. In an apparatus of the class described, a column having a liquid inlet and a vapor exit at the top and a vapor inlet and a liquid outlet at the bottom thereof, a plurality of horizontal foraminous trays spaced apart in said column, a layer of loose material on each of said trays and a foraminous diaphragm between the top of each layer and the bottom of the tray above it having its openings arranged to distribute the liquid substantially uniformly over the top surface of the layer beneath it, each of said diaphragms having a vapor opening arranged to permit vapor to pass upward therethrough and to prevent fluid on the diaphragm passing downward therethrough.

4. In an apparatus of the class described, a column having a liquid inlet and a vapor exit at the top and a vapor inlet and a liquid outlet at the bottom thereof, a plurality of horizontal foraminous trays spaced apart in said column, a layer of loose material on each of said trays and a foraminous diaphragm between the top of each layer and the bottom of the tray above it having its openings arranged to distribute the liquid substantially uniformly over the top surface of the layer beneath it, each of said diaphragms having a vapor opening arranged to permit vapor to pass upward therethrough and to prevent fluid on the diaphragm passing downward therethrough and each vapor opening having a hood over it to prevent liquid from the tray above falling through said opening.

EMIL PIRON.